United States Patent [19]

Stewart

[11] 4,041,649
[45] Aug. 16, 1977

[54] ALIGNMENT DEVICE
[75] Inventor: Robert H. Stewart, Tampa, Fla.
[73] Assignee: Practical Systems, Inc., Tarpon Springs, Fla.
[21] Appl. No.: 742,368
[22] Filed: Nov. 15, 1976
[51] Int. Cl.² .............................................. B24B 49/10
[52] U.S. Cl. ................................ 51/165.74; 33/185 R; 51/160
[58] Field of Search ........... 51/165 R, 165.74, 165.75, 51/160; 33/185 R

[56] References Cited
U.S. PATENT DOCUMENTS

| | | | |
|---|---|---|---|
| 1,518,394 | 12/1924 | Dey | 51/165.75 |
| 2,141,309 | 12/1938 | McCabe | 51/160 |
| 2,971,263 | 2/1962 | Rockafellow | 51/165.75 X |
| 3,160,870 | 12/1964 | Randall | 51/165.74 X |
| 3,499,226 | 3/1970 | Hopkins | 33/185 X |

Primary Examiner—Harold D. Whitehead
Attorney, Agent, or Firm—Duckworth, Hobby, Orman, Allen & Pettis

[57] ABSTRACT

An alignment device of the type primarily intended for use in combination with an ophthalmic cylinder surfacing machine to insure proper optical axis alignment of the lens blank, to the lap, as it is being ground. The device includes a base member which is fitted into the lap-retaining table of the surfacing machine and a top member which is fitted onto the pins of the pin holder of the machine. An open circuit including an audible or visual signal is mounted within the base member, and electrical contacts for the circuit are disposed on the base's upper surface. Corresponding electrical contacts are disposed on the bottom of the top member so that when the top is placed in contiguous, overlying relationship to the base, if the alignment of the machine is properly adjusted, the electrical circuit will be completed resulting in either an audible or visual signal to the operator that the machine is ready for use.

8 Claims, 10 Drawing Figures

ALIGNMENT DEVICE

BACKGROUND OF THE INVENTION

1. Field of the Invention.

The present invention relates to an alignment device intended for use in combination with ophthalmic cylinder surfacing machines to determine proper mechanical adjustments in that machine for grinding ophthalmic lenses.

2. Description of the Prior Art

Ophthalmic laboratories utilize cylinder surfacing machines for the purpose of grinding ophthalmic lenses in accord with the prescription written by ophthalmologist and optometrists. While such cylinder surfacing machines do not constitute a part of the present invention, their mode of operation is critical to full and complete understanding of the scope of this invention. These cylinder surfacing machines basically comprise a lap table used to hold the lap blank, which will determine the curve to be ground. Disposed above this lap is a movable pin holder into which a lens is inserted for surfacing in accord with the prescription. In order to grind the proper prescription, it is absolutely necessary that the pin holder be properly aligned with respect to the lap table.

The present state of the art calls for a manual/visual alignment of this crucial relationship. The operator places a metal block in the lap table. He then places a second metal block of the same width on top of the first. The second block has a groove in it to accept the pin holder pins. If the two blocks look or feel parallel, he assumes that the machine is aligned.

Another prior art method calls for the use of a single block having a V-groove formed on one face thereof and parallel to the block's longer sides. The operator places the block in the lap table with the V-groove up. If the pin holder pins do not fit into the V-groove, the pin holder is loosened and manually adjusted. In short, this method calls for just a visual determination.

It should be obvious that such a mechanical alignment verification is, at best, approximate. In fact, misalignment of a few thousandths of an inch is virtually impossible to detect utilizing this present method, and such misalignment will result in the preparation of a lens which is not in accord with the written prescription. This results in an expensive waste of lens material and operator time.

It is obvious, then, that there is a great need in the art for a device capable of insuring proper alignment of cylinder surfacing machines with a high degree of accuracy. Such a device should be of relatively simple construction so as to be easily used by the machine's operator. It should, of course, be durable, and it should require virtually no maintenance. Of perhaps greatest importance, is the necessity that the alignment device provide a readily identifiable signal to the operator that the cylinder surfacing machine is properly aligned.

SUMMARY OF THE INVENTION

The present invention relates to an alignment device of the type primarily intended for use in combination with an ophthalmic cylinder surfacing machine to insure proper alignment of the lap with the lens blank as the machine is utilized to grind the lens in accord with the ophthamologist's or optometrist's prescription. The device is basically two-part, comprising a base member and a top member. In the preferred embodiment, the base member comprises a rectangular solid dimensioned and constructed for insertion in the lap-retaining table of the surfacing machine. A correspondingly dimensioned and configured top member is provided for insertion onto the pins of the pin holder of the machine.

Disposed within the base member is a signal means including a source of electrical power, a signal device, and corresponding electrical conduits interconnecting these two elements and terminating in a pair of electrical contacts exposed on the surface of the base member. These first electrical contacts are not interconnected to each other, so that the signal means disposed in the base member defines an open electrical circuit.

A corresponding pair of second electrical contacts are exposed on the bottom of the device's top member. The second electrical contacts are electrically interconnected one to the other so that when corresponding ones of the first and second electrical contacts are mated, the electrical circuit is completed, resulting in actuation of the signal device. In the preferred embodiment the signal device comprises an audible alarm, though a visual indicator such as a light might be utilized.

Verification of proper alignment between the lap-retaining table and the pin holder arm of the cylinder surfacing machine is accomplished by virtue of the relative placement of the first and second electrical contacts. The first electrical contacts are disposed along the line defined by a perpendicular plane bisecting the longitudinal dimension of the base member's top surface. The second electrical contacts are disposed along the line defined by the centers of apertures formed in the top member for attaching the top member to the block-retaining arm of the surfacing machine. In the preferred embodiment, the first electrical contacts comprise strip contacts, while the second electrical contacts comprise pins. In use, then, if each of the first contacts is mated with a corresponding one of the second contacts, the circuit defining the signal means of the invention will be completed resulting in actuation of the audible signal itself.

Having made this verification, the operator of the ophthalmic cylinder surfacing machine is thereby assured that prescriptions will be ground into lenses in accord with the instructions given.

The operator can then remove the alignment device and insert actual lens blanks and laps used for preparing ophthalmic lenses.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
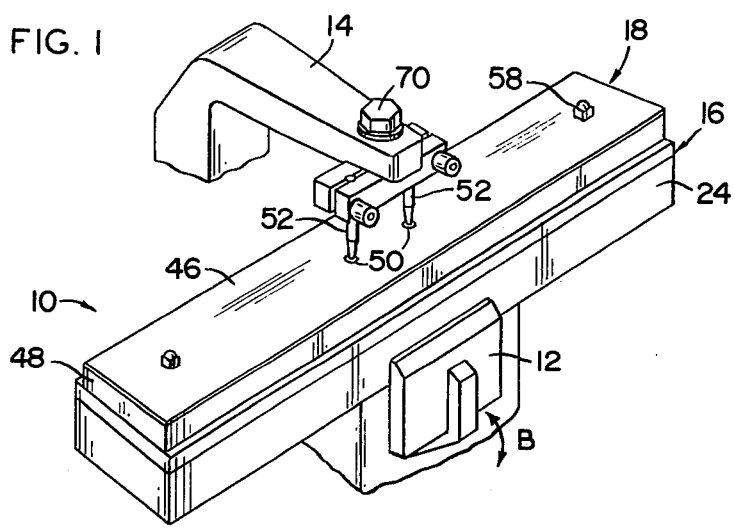
FIG. 1 is a perspective view of the alignment device showing its installation in an ophthalmic cylinder surfacing machine.

As best seen in the view of FIG. 1, the alignment device of the present invention is generally indicated as 10 and is there shown in operative position within lap table 12 and pin holder arm 14 of an ophthalmic cylinder surfacing machine (not shown). As will be discussed in greater detail below, device 10 basically comprises a base member generally indicated as 16 and a top member generally indicated as 18.

As best seen in the views of FIGS. 3, 5, 7 and 9, base member 16 comprises a generally rectangular solid having a top surface 20 and a bottom surface 22. Additionally, that portion of base member 16 including top surface 20 is removably attachable to base element 24 including bottom surface 22 by any suitable fastening means such as, for example, screws 26 inserted into corresponding apertures 28.

Figure 9:
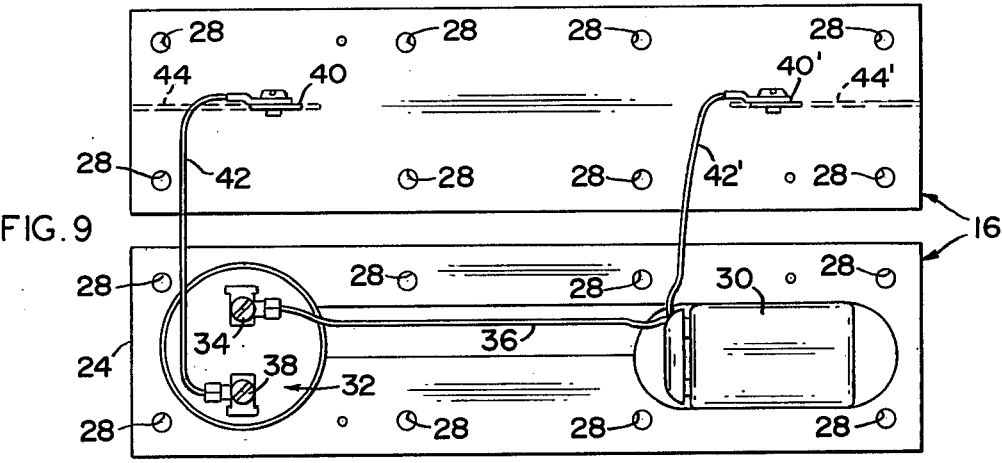
FIG. 9 is an interior, plan view showing the mating halves of the base member of the device.
Figure 10:
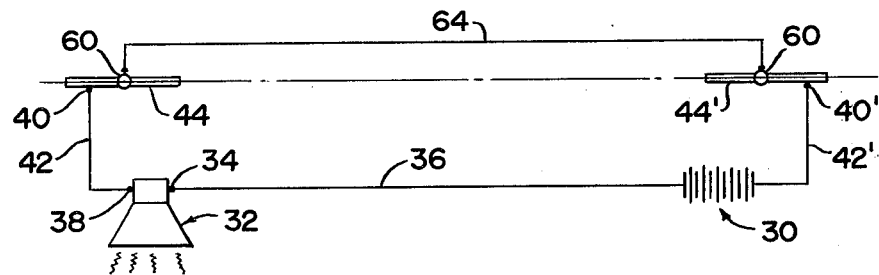
FIG. 10 is a schematic representation of the signal means of the device.

As best seen in the partially disassembled view of FIG. 9, mounted within base element 24 are a source of electrical power, such as, for example, battery 30 and an alarm 32. One terminal 34 of alarm 32 is electrically connected to the corresponding terminal of battery 30 by electrical connector 36. The remaining terminal 38 of alarm 32 is electrically connected to a first electrical contact 40 by connector 42. As shown by dotted line in FIG. 9 and directly in the plan view of FIG. 7, first electrical contact 40 further comprises a strip conductor 44 exposed on top surface 20 of base member 16. The other terminal of battery 30 is similarly connected to a corresponding first electrical contact 40' by its connector 42'.

Figure 2:
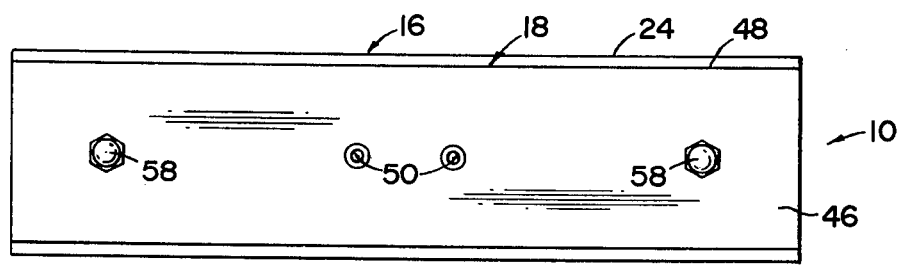
FIG. 2 is a top, plan view of the top member of the alignment device.
Figure 6:
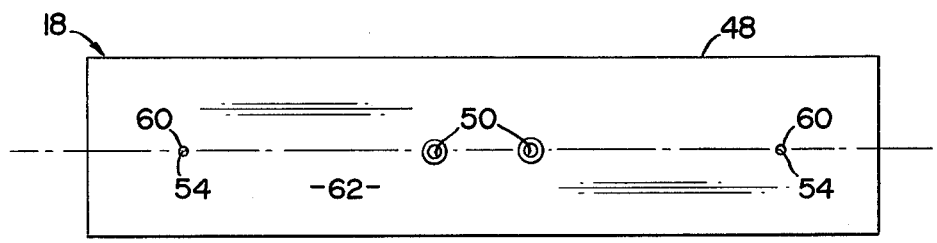
FIG. 6 is a plan view taken along line 6—6 of FIG. 3.
Figure 7:
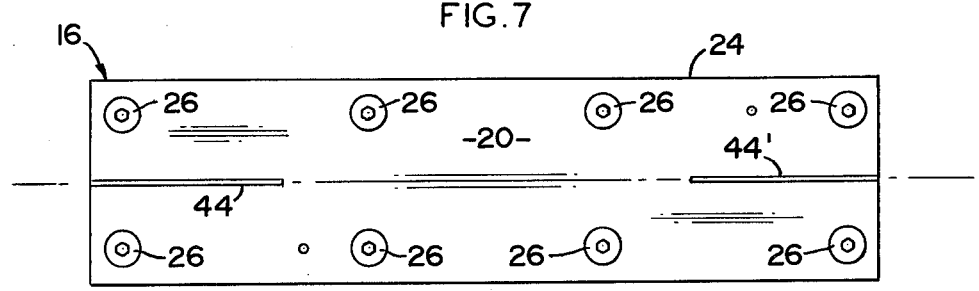
FIG. 7 is a plan view taken along line 7—7 of FIG. 3.
Figure 8:
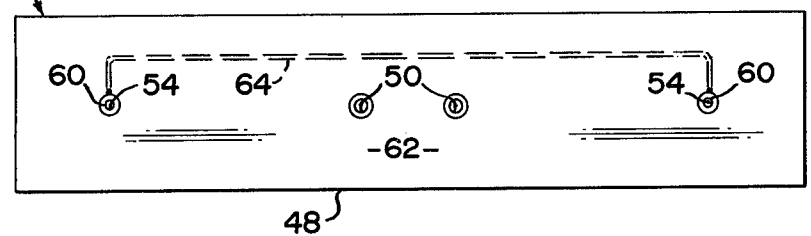
FIG. 8 is a view similar to that of FIG. 6 showing the electrical connection between the second electrical contacts in broken lines.

Top member 18, best seen in the views of FIGS. 2, 6 and 8, comprises a substantially rectangular solid including a cover plate 46 and a body 48. A pair of apertures 50 are correspondingly formed in plate 46 and body 48 so as to attach top member 18 to pins 52 of pin holder arm 14. A second pair of apertures 54 are similarly formed one on each side of apertures 50 and along the line defined by the centers of apertures 50.

Figure 4:
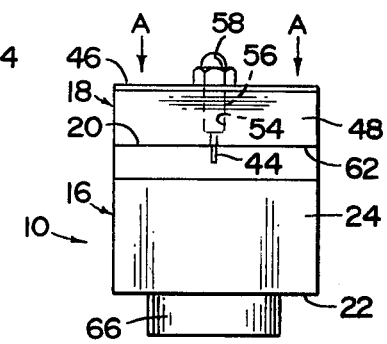
FIG. 4 is an end view of the device showing the interior details in phantom.
Figure 3:
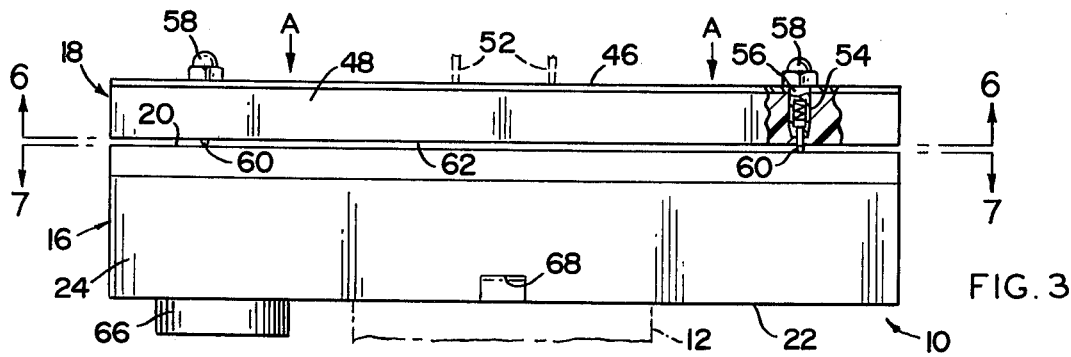
FIG. 3 is a side view of the device, partially cutaway to show construction details, and indicating attachment of the device to the cylinder surfacing machine in phantom.

As best seen in the views of FIGS. 3 and 4, cover plate 46 is attached to body 48 by spring bolts 56 and nuts 58. At this point it should be noted that a tip portion 60 extends through aperture 54 below the plane defined by bottom 62 of top portion 18. With particular regard to the two views of FIGS. 3 and 4, it should be noted that when top member 18 is depressed onto base member 16 in the direction of arrows A, tip portions 60 will ride up into apertures 54 by virtue of the construction of spring bolts 56. Nevertheless, tip portions 60 will contact top surface 20 of base member 16.

Now, with particular reference to the view of FIG. 8, it should be noted that apertures 54 and their corresponding spring bolts 56 including tip portions 60 are electrically connected one to the other by conductor 64. By virtue of this construction, when top member 18 is placed over base member 16 as shown in FIG. 4, the circuit for alarm 32 will be completed thereby indicating proper mechanical alignment between lap table 12 and pin holder arm 14.

While alarm 32 has been indicated as comprising an audible alarm, it should be obvious that a visual signal as a light could be substituted therefor quite easily. In this regard it should be noted that alarm 32 communicates to the outside of alignment device 10 through grill 66 on bottom surface 22 of base member 16.

Figure 5:
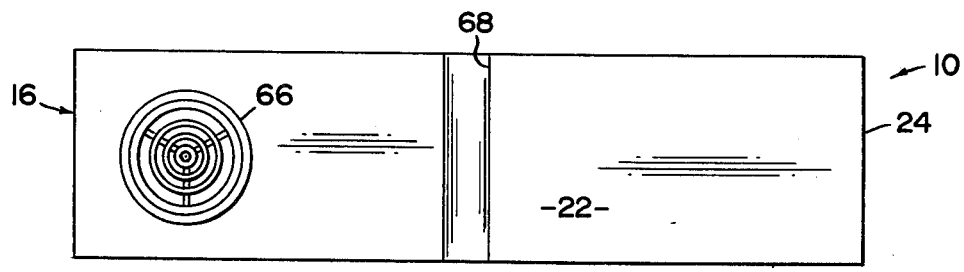
FIG. 5 is a bottom, plan view of the base member of the device.

In operation, device 10 is used substantially as follows. Base member 16 is placed within lap table 12 as indicated in the view of FIG. 1. As shown in that view, lap table 12 may be manipulated in the direction of double arrow B to graspingly retain base member 16 therein. As best seen in the views of FIGS. 3 and 5, a groove 68 is formed on bottom surface 22 of base element 24 to permit proper placement of base member 16 within lap table 12. Top member 18 is then placed on pin holder arm 14 by inserting pins 52 into corresponding ones of apertures 50. Base member 16 and top member 18 are then mechanically clamped together in the direction of arrows A. As the cylinder surfacing machine is operated, lap table 12 remains stationary, while pin holder arm 14 moves about in a predetermined, oscillating fashion. To verify proper alignment of pin holder arm 14 with respect to lap table 12, this motion is mechanically induced by the operator resulting in top member 18 "sliding" randomly across top surface 20 of base member 16. If pin holder arm 14 is properly aligned with respect to lap table 12, second electrical contacts corresponding to tip portions 60 will simultaneously mate with corresponding ones of strip conductors 44 and 44'. This will complete the electrical circuit of the signal means of the present invention, providing an audible/visual alarm to the operator that the cylinder surfacing machine is properly aligned. If the machine is not properly aligned, pin holder arm 14 is adjusted by loosening bolt 70 on arm 14. Device 10 can then be removed from the surfacing machine, and surfacing operations may proceed.

It will thus be seen that the objects set forth above, among those made apparent of the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An alignment device of the type primarily intended for use in combination with an ophthalmic cylinder surfacing machine, said device comprising: a base member configured and dimensioned to be removably held by the lap table of said machine; and a top member including a plurality of apertures formed therein in corresponding relation to pins extending outwardly from the pin holder arm of said machine, whereby said top member may be positioned in contiguous, overlying relation to said base member; said base member comprising signal means mounted therein, said signal means including a plurality of first electrical contacts disposed on the surface of said base member; and a correspondingly positioned plurality of second electrical contacts disposed on the bottom of said top member, whereby said signal means will be actuated when all of said first electrical contacts mate with their corresponding second electrical contacts to indicate proper alignment of said ophthalmic cylinder surfacing machine.

2. An alignment device as in claim 1 wherein said signal means comprises a source of electrical power connected to an audible alarm, said source and said alarm being further connected to individual ones of said first electrical conduits to define an open circuit.

3. An alignment device as in claim 1 wherein said second electrical contacts are electrically interconnected one to another.

4. An alignment device as in claim 1 wherein said first electrical contacts are disposed along the line defining the longitudinal bisector of said base member's surface.

5. An alignment device as in claim 1 wherein said second electrical contacts are disposed along the line defined by the centers of said top member's apertures.

6. An alignment device as in claim 1 wherein said signal means comprises a source of electrical power connected to a visual alarm, said source and said alarm being further connected to individual ones of said first electrical conduits to define an open circuit.

7. An alignment device as in claim 1 wherein said first electrical contacts comprise a pair of strip contacts.

8. An alignment device as in claim 1 wherein said second electrical contacts comprise a pair of pin contacts.

* * * * *